United States Patent Office 3,548,300
Patented Dec. 15, 1970

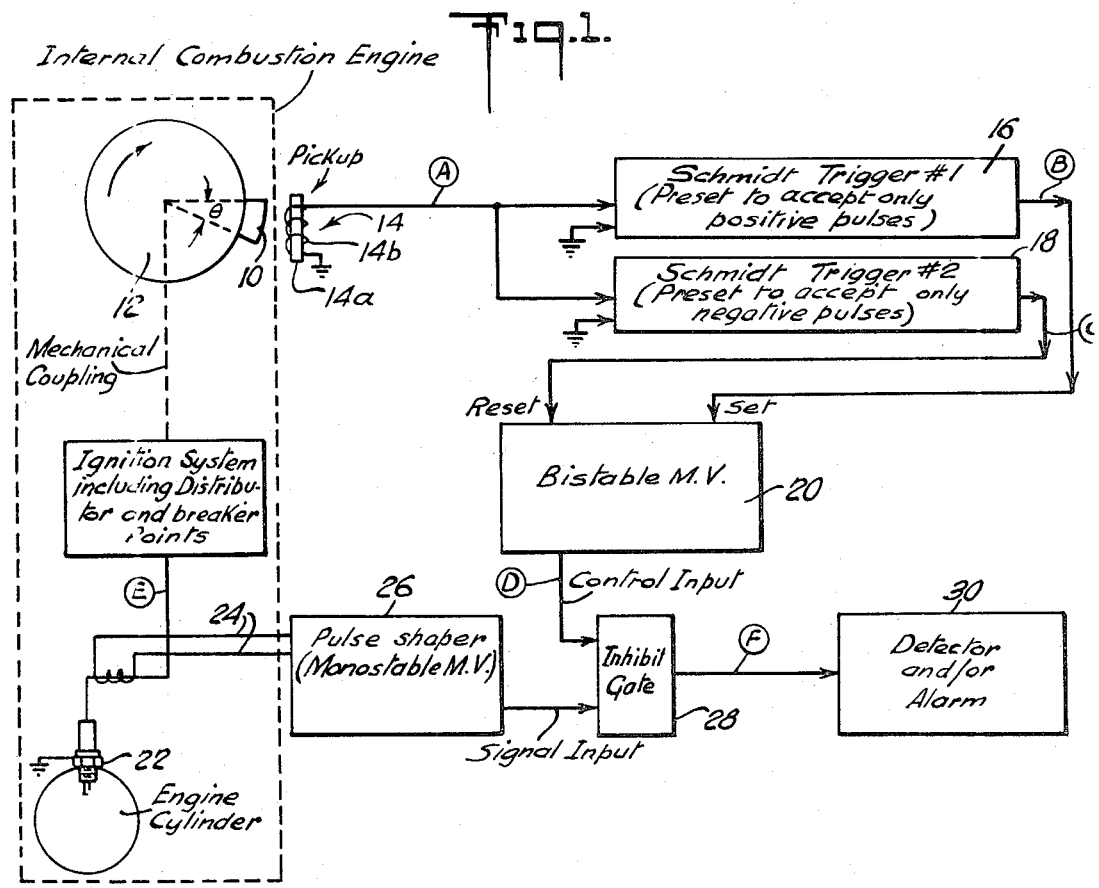
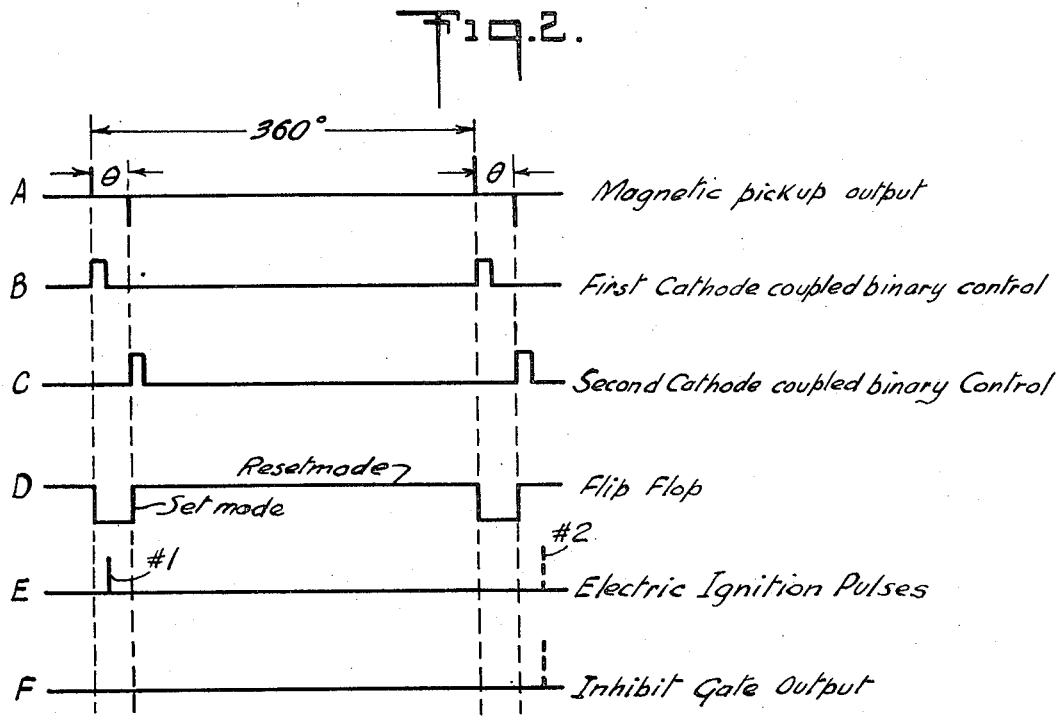

3,548,300
METHOD AND APPARATUS FOR AN IGNITION TIMING INDICATOR
Jerry L. Nolting, Fishkill, N.Y., assignor to Texaco Inc., New York, N.Y., a corporation of Delaware
Filed Sept. 30, 1968, Ser. No. 763,711
Int. Cl. G01m 15/00
U.S. Cl. 324—15                                   15 Claims

ABSTRACT OF THE DISCLOSURE

An ignition timing error is detected in a spark ignited internal combustion engine by generating a signal during a pre-established portion of an engine cycle appropriate for generation of an ignition pulse, which signal actuates associated inhibit circuitry to block transmission of the ignition pulse to a detecton zone during the period of the generated signal and disables the associated inhibit circuitry at the end of the generated signal, to establish a continuous circuit for transmission of the ignition pulse to the detection zone.

BACKGROUND OF THE INVENTION

This invention relates generally to a method and apparatus for detecting an ignition timing error in an internal combustion engine. Specifically the present invention relates to a method and apparatus for detecting when a spark ignited internal combustion engine is not timed properly.

For a spark ignited internal combustion engine to deliver maximum power, an appropriate ignition spark must be delivered to the combustion chamber within a pre-established portion of the engine cycle, i.e., within a tolerance of a few crank degrees.

Thus, each engine has a tolerance period of a few crank degrees during which an ignition spark must be delivered to the combustion chamber for maximum power as well as efficient operation. Outside this period, there is a resultant power loss, with inefficient fuel utilization, possible knock, or serious damage occurring in the engine if this timing error is not detected and corrected. When an engine is operating inefficiently, the emission of noxious polluting hydrocarbons into the atmosphere may increase drastically, for example, at cruising speed, an advance of 10 crank degrees may increase emission of pollutants by as much as 25 percent or more.

Presently, ignition timing is determined by use of an ignition timing light. One lead of the ignition timing light is usually connected to a source of power, one to chassis ground, and the other to the wire leading to a selected spark plug in the engine. The light is of the stroboscopic type having a high frequency response and flashes each time an ignition pulse is being transmitted to the combustion chamber of interest. The light is directed toward the engine crankshaft pulley or other moving member in the engine where a marker is provided opposite a plate or tab usually on the timing case cover provided with timing marks thereon. The ignition system is adjusted usually by rotating the distributor in the required direction, until the correct mark and notch line up, at which time the ignition pulse is indexed exactly at the proper interval for the engine.

The use of the ignition timing light is limited to periods where the automobile is immobile, as the serviceman must have the automobile engine exposed to make the visual test.

SUMMARY OF THE INVENTION

Briefly described, this invention relates to a method of detecting an ignition timing error in an internal combustion engine requiring a spark ignition pulse to ignite fuel in the combustion zone. A timing range gating signal is generated during a portion of an engine cycle pre-established for timely conduction of the ignition pulse to the combustion zone in order to achieve efficient operation of the engine. An ignition pulse signal is generated in timed correlation with the occurrence of the ignition pulse. Transmission of the ignition pulse signal to a signal detector is blocked during the period of this pre-established timing range gating signal but permits transmission of the ignition pulse signal to the signal detector in the absence of the pre-established timing range gating signal.

Accordingly, it is an object of the present invention to provide a new and improved method and apparatus for detecting an ignition timing error in a spark ignited internal combustion engine.

It is another object of the invention to provide a novel method and apparatus for detecting an ignition timing error of a spark ignited internal combustion engine when the automobile is in use.

These and other objects, features and advantages of the invention will become apparent from the following description when read in conjunction with the accompanying drawings.

BRIEF DESCRIPTION OF THE DRAWINGS

FIG. 1 is a block diagram of an embodiment of the present invention;

FIG. 2 is a timing diagram used in explaining the operation of the present invention;

DESCRIPTION OF THE PREFERRED EMBODIMENTS

Figure 3:
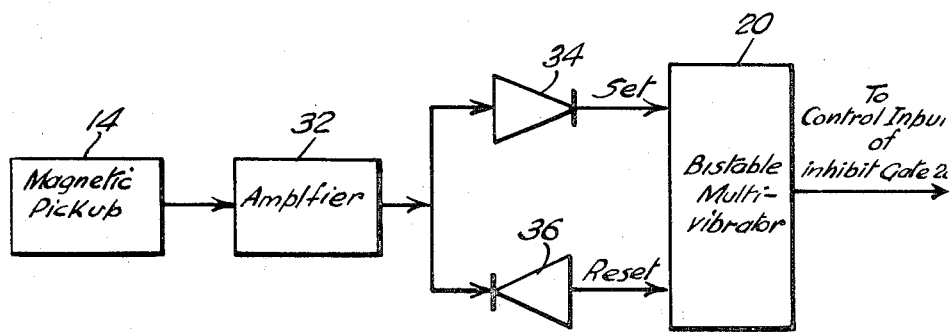
FIG. 3 is a block diagram of an alternate embodiment of the present invention.

In a preferred embodiment of the present invention, a ferric block 10 is attached to the periphery of a disc 12, for example, a fly wheel, mounted on an appropriate rotating member of the engine rotating at engine speed, so that it will be indicative of the status of the internal combustion engine cycle. The length of the arcuate ferric block 10 subtends a mechanical angle $\theta$ which substantially corresponds to the predetermined tolerance period during which combustion must occur for efficient operation of the engine. A magnetic pick-up 14, an instrument well known in the art, comprising an internal magnet 14a and a pick-up coil 14b, induces a positive polarity pulse and a negative polarity pulse (or vice versa) as a ferric block enters and leaves, respectively, a magnetic field sustained thereby. Pickup 14 is of rugged construction to insure dependable operation even under highly vibratory operating conditions.

The magnetic pick-up 14 is disposed in the vicinity of the disc 12 so that the pick-up coil 14b will be excited by the ferric block 10 as it passes thereby. It is to be understood that a photoelectric device or any other means of developing an electrical pulse at the beginning and end of the tolerance period can suitably replace the magnetic pickup 14.

The output of the pickup coil 14b (waveform A of FIG. 2) is applied simultaneously by means of parallel circuit paths to the respective inputs of a first and second of two cathode-coupled binary circuits 16 and 18, respectively. The cathode-coupled binary circuit is sometimes referred to as a Schmitt trigger and is described in Pulse and Digital Circuits by Millman and Taub, McGraw Hill Book Company, Inc., N.Y., first edition on pages 164 through 168. A cathode-coupled binary circuit can be preset to emit a square pulse when a particular mode voltage signal appears at its input.

In the present embodiment, the first cathode-coupled binary circuit is preset to trigger a pulse only when a positive polarity voltage is present at its input. Conversely, the second cathode-coupled binary circuit is preset to trigger a pulse only when a negative polarity voltage is present at its input.

A bistable multi-vibrator 20 having a set input, reset input, and an output is a well known device in the art which produces a first mode output when a pulse is transmitted to its set input and a second mode output when a pulse is transmitted to its reset input. The respective outputs of the first and second cathode-coupled binary circuits are connected to the set input and the reset input, respectively, of the bistable multi-vibrator 20.

A positive polarity signal is transmitted to the input of the first cathode-coupled binary circuit as the leading edge of the ferric block 10 passes through the magnetic field of the magnetic pickup 14 while the engine is in operation. A negative polarity signal is transmitted to the input of the second cathode-coupled binary circuit as the trailing edge of the ferric block 10 passes through the magnetic field of the magnetic pickup 14 while the engine is in operation.

The first cathode-coupled binary circuit is triggered (waveform B) by the positive polarity signal actuating the bistable multivibrator 20 into the set mode.

The second cathode-coupled binary circuit 18 is triggered (waveform C) by the negative polarity signal, actuating the bistable multi-vibrator 20 back into its reset mode (see waveform D).

The ignition spark for an internal combustion engine is produced by an electric pulse developed in the ignition system and transmitted to the appropriate spark plug, such as 22, which produces the spark in the combustion chamber. A coil 24 wound around the outside of the spark plug wire leading to the corresponding combustion chamber of interest in the internal combustion engine (not shown) inductively develops a potential therein (waveform E) when the electric ignition pulse passes to the spark plug 22 to produce the spark discharge. The ends of the coil 24 are connected to the input of a pulse shaper 26.

Pulse shaper 26 can be any well known circuit such as a monostable multi-vibrator which provides a sharp square shaped wave of a short duration with respect to the predetermined tolerance period, at its output side in response to a signal transmitted to its input side such as the ignition pulse. Functionally, a pulse from the pulse shaper 26 is of short enough duration so that its time occurrence can be precisely established. Additionally the pulse shaper 26 acts as an amplitude discriminator so that, for example, the pulse developed when the points of the ignition system of the internal combustion engine close, does not develop an output signal.

An inhibit gate 28, having a signal input, a control input, and an output is a well known circuit which will provide an output signal in response to a signal applied to its input only when a proper signal is also applied to its control input. An example of the inhibit gate 28 is an "AND" gate with two inputs, as described hereinafter, which requires that proper signals be applied simultaneously at both inputs thereof to produce an output.

The outputs of pulse shaper 26 and bistable multi-vibrator 20 are connected to the signal input and the control input, respectively, of the inhibit gate 28. The output of the inhibit gate 28 is connetced to the input of a detecting means 30 such as a visual or audible alarm, which is well known in the art. In the present embodiment, when the bistable multi-vibrator 20 is in its set mode, the pulse received at the signal input of the inhibit gate 28 corresponding to the electric ignition pulse (waveform E) is blocked and will not be transmitted to the detecting means 30, as illustrated in FIG. 2 by the lack of an inhibit gate output pulse F corresponding to the #1 electric ignition pulse E. The bistable multi-vibrator is in the set mode only during the tolerance period for production of an ignition spark. If an electric ignition pulse E occurs outside of the tolerance period, i.e., when the bistable multi-vibrator 20 is in its reset mode, an inhibit gate output signal will be transmitted to the input of the detecting means 30 giving an audio or visual alarm to the operator indicating that the timing is not within tolerance. The latter case is illustrated in FIG. 2 by the dotted inhibit gate output pulse E corresponding to the #2 dotted electric ignition pulse E shown occurring outside of the tolerance period defined by the bistable multi-vibrator output pulse D corresponding to the engine or flywheel rotational angle θ.

An alternate embodiment is shown in FIG. 3. A current amplifier 32 of a conventional type has an output connected in parallel circuit arrangement, to the anode of a first diode 34 and the cathode of a second diode 36. As is well known, a diode offers a very high resistance to a signal if the cathode is made positive with respect to the anode but offers a negligible resistance when the voltage is reversed. The input of the amplifier 32 is connected to the input of the magnetic pickup 14 (similar to FIG. 1) and the cathode and anode of the first and second diodes, respectively, are connected to the set input and reset input of the bistable multi-vibrator 20 (again similar to FIG. 1). Thus, the amplifier 32 and diodes 34 and 36 are substituted for the first and second cathode-coupled binary circuits 16 and 18, respectively. The polarity of the positive and negative electric pulses produced by the magnetic pickup 14 when the ferric block 10 enters and leaves, respectively, the magnetic field sustained thereby are transmitted only through the diode offering the least resistance to the pulses. Thus, the positive pulse (produced when the leading edge of the ferric block enters the magnetic field) is transmitted through the first diode 34, to the set input of the bistable multi-vibrator 20 and the negative pulse (produced when the trailing edge of the ferric block enters the magnetic field) is transmitted through the second diode 36, to the reset input of the bistable multi-vibrator 20. The amplifier 32 is necessary especially at low engine speeds, to increase the signal level of the pulses transmitted to the set input and reset input of the bistable multi-vibrator 20.

Figure 4:
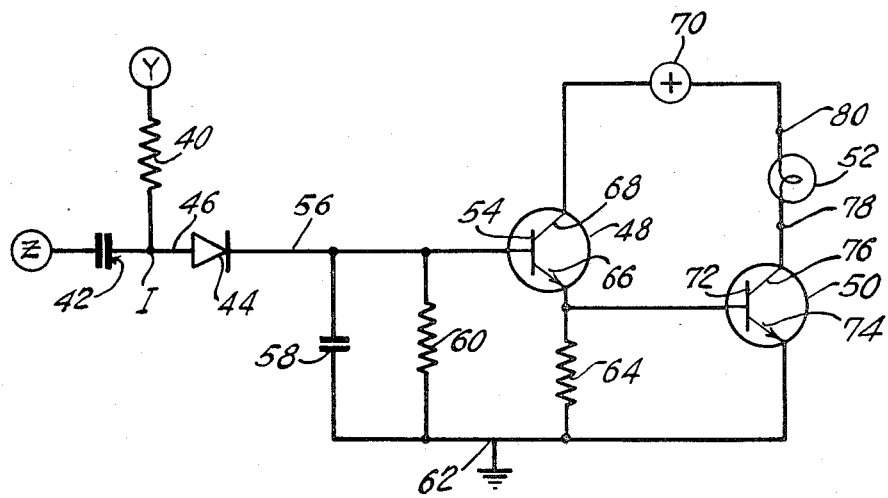
FIG. 4 is a schematic diagram of a portion of FIG. 1.

A schematic embodiment of the inhibit gate 28 and the detector circuit 30 are shown in FIG. 4. The inhibit gate 28 is connected at a junction Y to the output of the bistable multi-vibrator 20 and at a junction Z to the output of the pulse shaper 26. A 10,000 ohm resistor 40 is connected between the junction Y and a nodal point or gate I. A 0.001 microfarad capacitor 42 connects the junction Z to the gate I and the positive lead 46 of a diode 44 such as a General Electric IN191 is connected to the gate I.

The detecting means 30 comprises a first and second NPN transistor 48 and 50, respectively, such as, for example, General Electric 2N697's, and a 12 volt pilot lamp 52 which operates on a low current supply, for example, an 80 milliamp requirement. The first transistor 48 is shown in the common collector or emitter follower configuration and the second transistor 50 is shown in the common emitter configuration. The base 54 of the first transistor 48 is connected to the negative lead 56 of the diode 44. The diode 44 is poled to pass current from the positive lead 46 to the negative lead 56. A 1 microfarad capacitor 58 and a 100,000 ohm resistor 60 are connected in parallel from the base 54 of the first transistor 48 to ground potential 62.

A 10,000 ohm resistor 64 is connected from the emitter 66 of the first transistor 48 to ground potential 62 and the collector 68 of the first transistor 48 is connected to +12 volts, i.e., the positive terminal 70 of the internal combustion engine battery (not shown). The base 72 of the second transistor 50 is connected to the emitter 66 of the first transistor 48 and the emitter 74 of the second transistor 50 is connected to ground potential 62. The collector 76 of the second transistor 50 is connected to a lead 78 of the 12-volt pilot lamp 52. The other lead 80 of the 12-volt pilot lamp 52 is connected to the positive terminal 70.

In operation, only when junction Y is at or near ground potential, i.e., when the output of the bistable multi-vibrator 20 is in the reset mode and a positive pulse is transmitted from the monostable vibrator 26, will the positive pulse pass through the diode 44 and charge up the 1 microfarad capacitor 58. The voltage developed across the 1 microfarad capacitor 58 biases the base 54 to emitter 66 circuit of the first transistor 48 so that it conducts through the 10,000 ohm resistor 64, biasing the base 72 to emitter 74 circuit of the second transistor 50, thereby conducting current from positive terminal 70 through the 12-volt pilot lamp 52 which is heated to incandescence thereby. The lighted 12-volt pilot lamp 52 is an alarm that the spark was not introduced into the combustion chamber during the predetermined period.

When the output of the bistable multi-vibrator 20 is in the set mode (junction Y), a signal appearing at the Z junction cannot forward bias the diode 44 and the diode 44 will not pass current to the detector circuit. Without current being transmitted through the diode 44, the 100,000 ohm resistor 60 which is connected across the one microfarad capacitor 58 will bleed all current therefrom in a very short time so that there will be no biasing of the base 54 to emitter 66 circuit of the first transistor 48.

Obviously, many modifications and variations of the invention as hereinbefore set forth may be made without departing from the spirit and scope thereof, and therefore only such limitations should be imposed as are indicated in the appended claims.

It is to be understood that the ignition system, schematically designated by the block so denoted, may be of a conventional type including a distributor, breaker points, coil, condenser and battery, all of which are well known in the art. Such an ignition system comprises means for producing an electric ignition pulse which is applied to the spark plug 22 for firing the combustible mixture supplied in known manner to the engine cylinder. It is to be understood that the distributor functions in known manner to supply similar ignition pulses in appropriate timed sequence to the various cylinders of the engine. As indicated by the dashed line extending between the block designated ignition system and the fly wheel 12, the operation of the ignition system is mechanically coupled to the engine fly wheel in known manner. The timing of the ignition pulses is synchronized in the usual manner with the operation of the engine, i.e., so that the position of the fly wheel, the position of the various pistons within their respective cylinders, and the operation of the distributor and breaker points of the engine are all maintained in appropriate timed relationship. Such mechanical coupling may be achieved through known techniques such as the use of cams and timing gears or chains, as the case may be. Since the details of the ignition system, per se, and the mechanical coupling between the ignition system and the position of the fly wheel and associated cylinders of the engine are well known in the art, their precise construction is not illustrated.

I claim:

1. A method of detecting at least during alternate engine cycles, an ignition timing error in an internal combustion engine having an ignition system including means for producing an electrical ignition pulse which ignites the fuel in the combustion zone therein, comprising:
   (a) generating a timing range gating signal during a predetermined portion of the engine cycle when an ignition pulse must be delivered to said engine for efficient operation;
   (b) generating an ignition pulse signal in timed correlation with the occurrence of said ignition pulse;
   (c) blocking transmission of said ignition pulse signal along a closed electrical circuit path from said ignition pulse signal producing means to a signal pulse detector during the period of said signal; and
   (d) detecting the transmission of said ignition pulse signal along said closed electrical circuit path to said detector in the absence of said timing range gating signal, so that said ignition pulse is detected only when generated outside said pre-established portion of said engine cycle thereby effectively detecting said ignition pulse only when said timing is in error.

2. A method as recited in claim 1, wherein said generated gating signal comprises pulses generated at least at the start and end of said pre-established portion of said engine cycle so that said pulses can digitally energize associated electronic circuitry for inhibiting the detection of said ignition pulse.

3. A method as recited in claim 2, wherein said gating pulses generated at the start and end of said pre-established portion of said engine cycle, are of opposite polarity.

4. An apparatus for detecting an ignition timing error in an internal combustion engine having an ignition system means for producing an electrical ignition pulse which ignites the fuel in the combustion chamber, which comprises:
   (a) signal generating means for generating a timing range gating signal defining the start and end of a portion of an engine cycle pre-established for transmitting said ignition pulse to said combustion chamber for efficient operation thereof;
   (b) ignition pulse signal generating means for generating an ignition pulse signal in timed correlation with the transmission of said ignition pulse to said combustion chamber;
   (c) detecting means operatively coupled to said ignition pulse generating means and responsive to the ignition pulse signals therefrom to generate a sensible indication; and
   (d) inhibiting means operatively coupled to said gating signal generating means and said detecting means for interrupting the transmission of said ignition pulse signal from said ignition pulse signal generating means to said detecting means during the period said signal is generated by said signal generating means, whereby ignition pulse signals generated by said ignition pulse signal generating means during said pre-established period of an engine cycle are prevented from actuating said detecting means.

5. An apparatus as described in claim 4, further comprising switching means operatively coupled between an output of said gating signal generating means and said inhibiting means, said switching means being responsive to the beginning of said signal from said gating signal generating means for activating said switching means to a first mode which enables said inhibiting means to prevent transmission of said ignition pulses from said ignition pulse generating means to said detecting means and said switching means being responsive to the end of said signal from said gating signal generating means for activating said switching means to a second mode which disables said inhibiting means from preventing transmission of said ignition pulse signal from said ignition pulse signal producing means to said detecting means.

6. An apparatus as described in claim 5, in which said switching means is bistable multi-vibrator having a set input, reset input and output.

7. An apparatus as described in claim 6, comprising a first and a second cathode-coupled binary circuit, each having an input and an output, both of said cathode-coupled binary circuit inputs being operatively coupled to an output of said gating signal generating means, the output of said first cathode-coupled binary circuit being connected to the set input of said bistable multi-vibrator, the output of said second cathode-coupled binary circuit being coupled to the reset input of said bistable multi-vibrator, said first cathode-coupled binary circuit being responsive to said beginning of said signal from said signal generating means and said second cathode-coupled binary circuit being responsive to said end of said signal from said signal generating means.

8. An apparatus as described in claim 7, in which said signal generating means includes a non-magnetic disc removably attached to a rotatable member of said internal combustion engine, a ferric block mounted to said disc for rotation therewith, means including a magnetic pick-up mounted stationary relative to said engine and adjacent said ferric block, and having an output coupled to said inputs of said first and said second cathode-coupled binary circuits.

9. An apparatus as described in claim 8, in which said detecting means has a signal input and produces a sensible output and said inhibiting means is an inhibit gate having a control input connected to the output of said bistable multi-vibrator and a signal input operatively coupled to said ignition pulse signal producing means and an output connected to said input of said detecting means.

10. An aparatus as described in claim 9, including pulse shaping means having an input operatively coupled to the output of said ignition pulse generating means and wherein said pulse shaping means has an output operatively coupled to said signal input of said inhibit gate.

11. An apparatus as described in claim 8, in which said rotating member of said internal combustion engine is a fly-wheel shaft.

12. An apparatus as described in claim 6, in which said apparatus includes a first and second diode, which are in parallel circuit arrangement and operatively coupled to the output of said gating signal generating means and wherein the cathode and anode of said first and second diode, respectively, are connected to the set and reset inputs, respectively, of said bistable multi-vibrator.

13. An apparatus as described in claim 12, including a power amplifier having an input and an output, said input being connected to the output of said gating signal generating means and said output being connected to the anode and cathode of said first and second diode, respectively, whereby the signal from said gating signal generating means is amplified to positively actuate said bistable multi-vibrator.

14. An apparatus for detecting an ignition timing error in an internal combustion engine requiring an ignition system including means for producing an ignition pulse which ignites the fuel in the combustion chamber, which comprises:
(a) signal generating means for generating a first timing range gating signal pulse of a fixed polarity at least at the start of a portion of an engine cycle pre-established for transmitting said ignition pulse to said combustion chamber for efficient operation thereof, and a second timing range gating signal pulse of a polarity opposite to said fixed polarity at least at the end of said portion of said engine cycle pre-established for transmitting said ignition pulse to said combustion chamber;
(b) ignition signal pulse generating means for generating an ignition pulse signal in timed correlation with the transmission of said ignition pulse to said combustion chamber;
(c) a first cathode-coupled binary circuit responsive to said first timing range gating signal pulse polarity, to trigger an output therefrom, having an input and an output connection, said input being connected to the output of said signal generating means;
(d) a second cathode-coupled binary circuit responsive to said second timing range gating signal pulse polarity opposite said fixed polarity to trigger an output therefrom, having an input and an output connection, said input being connected to the output of said signal generating means in parallel circuit arrangement with said input of said first cathode-coupled binary circuit;
(e) a bistable multi-vibrator having a set input, reset input and an output, said set input being connected to the output of said first cathode-coupled binary circuit and responsive thereto for a first mode output, and said reset input being connected to the output of said second cathode-coupled binary circuit and responsive thereto for a second mode output;
(f) an inhibit gate having a control input, a signal input, and an output, said signal input being coupled to said ignition signal pulse generating means and responsive to said ignition signal pulse developed thereby, and said control input being connected to the output of said bistable multi-vibrator and responsive thereto so that when a pulse is transmitted to said set input of said bistable multi-vibrator from said first cathode-coupled binary circuit, said bistable multi-vibrator output generates a first mode signal which causes said inhibit gate to inhibit any signal appearing at its signal input and a pulse is transmitted to said reset input of said bistable multi-vibrator from the output of said second cathode-coupled binary circuit, said bistable multi-vibrator from the output of said second cathode-coupled binary circuit, said bistable multi-vibrator output generates a second mode signal which causes said inhibit gate to pass any signal appearing at said signal input to its output; and
(g) a detector having an input connected to the output of said inhibit gate and responsive to the pulses generated in said ignition coil and passed through said inhibit gate and a sensible output.

15. An apparatus as described in claim 14, in which a pulse shaping means having an input and an output is connected so that the input thereof is connected to said ignition system and the output thereof is connected to the signal input of said inhibit gate, whereby ignition pulses transmitted to said pulse shaping means input, generate a rectangularly shaped pulse at said pulse shaping means output to digitally actuate said detector.

References Cited
UNITED STATES PATENTS 3,286,164   11/1966   De Huff _____ 324—16

RUDOLPH V. ROLINEC, Primary Examiner

M. J. LYNCH, Assistant Examiner

U.S. Cl. X.R.

73—118; 340—268